(12) United States Patent
Potter et al.

(10) Patent No.: US 7,608,951 B2
(45) Date of Patent: Oct. 27, 2009

(54) FULLY REDUNDANT SPACECRAFT POWER AND ATTITUDE CONTROL SYSTEM

(75) Inventors: Calvin C. Potter, Mesa, AZ (US); David Corcino, Chandler, AZ (US); Paul T. Wingett, Mesa, AZ (US); Casey Hanlon, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 463 days.

(21) Appl. No.: 11/580,664

(22) Filed: Oct. 13, 2006

(65) Prior Publication Data

US 2008/0087133 A1 Apr. 17, 2008

(51) Int. Cl.
*H02K 7/02* (2006.01)

(52) U.S. Cl. ........................ 310/74; 310/90.5

(58) Field of Classification Search .......... 310/90–90.5, 310/179–180, 74, 254, 261
See application file for complete search history.

(56) References Cited

U.S. PATENT DOCUMENTS

| | | | |
|---|---|---|---|
| 3,955,858 A * | 5/1976 | Poubeau | 310/90.5 |
| 4,444,444 A * | 4/1984 | Benedetti et al. | 310/90.5 |
| 4,483,570 A * | 11/1984 | Inoue | 310/90.5 |
| 4,700,094 A * | 10/1987 | Downer et al. | 310/90.5 |
| 4,723,735 A * | 2/1988 | Eisenhaure et al. | 244/165 |
| 5,708,312 A * | 1/1998 | Rosen et al. | 310/90 |
| 5,747,907 A * | 5/1998 | Miller | 310/90 |
| 5,998,899 A * | 12/1999 | Rosen et al. | 310/90.5 |
| 6,201,329 B1 * | 3/2001 | Chen | 310/90.5 |
| 6,262,505 B1 * | 7/2001 | Hockney et al. | 310/90.5 |
| 6,566,775 B1 * | 5/2003 | Fradella | 310/90.5 |
| 6,664,680 B1 * | 12/2003 | Gabrys | 310/74 |
| 6,700,259 B1 * | 3/2004 | Lin et al. | 310/90.5 |
| 6,779,759 B1 | 8/2004 | Klupar et al. | |
| 6,845,952 B2 | 1/2005 | Abel et al. | |
| 6,882,072 B2 | 4/2005 | Wingett et al. | |
| 6,921,998 B2 | 7/2005 | Giles et al. | |
| 7,078,880 B2 | 7/2006 | Potter et al. | |

* cited by examiner

*Primary Examiner*—Thanh Lam
(74) *Attorney, Agent, or Firm*—Ingrassia Fisher & Lorenz, P.C.

(57) ABSTRACT

An energy storage flywheel system for a spacecraft is implemented with a fully redundant rotating group and gimbal actuator. In particular, the gimbal actuator, motor/generator, primary bearings, and secondary bearing actuator are each implemented with a pair of redundant coils or motors.

20 Claims, 5 Drawing Sheets

FULLY REDUNDANT SPACECRAFT POWER AND ATTITUDE CONTROL SYSTEM

STATEMENT REGARDING FEDERALLY SPONSORED RESEARCH OR DEVELOPMENT

This invention was made with Government support under agreement number F29601-01-2-0046 awarded by the Air Force Research Laboratory. The Government has certain rights in this invention.

TECHNICAL FIELD

The present invention relates to energy storage flywheel systems and, more particularly, to a fully redundant energy storage flywheel system for spacecraft power and attitude control.

BACKGROUND

Many satellites and other spacecraft, as well as some terrestrial stationary and vehicle applications, such as seagoing vessels, can include one or more energy storage flywheel systems to provide both a backup power source and to provide attitude control for the vehicle. In such systems, each flywheel system is controlled and regulated to balance the electrical demand in the vehicle electrical distribution system, and may also be controlled in response to programmed or remote attitude (or torque) commands received by a main controller in the vehicle.

Many energy storage flywheel systems include one or more components that are rotationally supported within a housing assembly. These components, which may be referred to as the rotating group, include, for example, an energy storage flywheel, a motor/generator, and a shaft. In particular, the energy storage flywheel and motor/generator may be mounted on the shaft, which may in turn be rotationally supported in the housing assembly via one or more bearing assemblies. In many instances, the shaft is rotationally supported using one or more primary bearing assemblies, and one or more secondary, or back-up, bearing assemblies. For example, in many satellite and spacecraft applications, the flywheel system may include one or more magnetic bearing assemblies that function as the primary bearing assemblies, and one or more mechanical bearing assemblies that function as the secondary bearing assemblies. Typically, the primary bearing assemblies are used to rotationally support the rotating group, while the secondary bearing assemblies are otherwise disengaged from the rotating group. If one or more of the primary bearing assemblies is deactivated due, for example, to a malfunction, or otherwise becomes inoperable to rotationally support the rotating group, the secondary bearing assemblies will then engage, and thereby rotationally support, the rotating group.

It is postulated that one or more of the above-mentioned components could become inoperable during energy storage flywheel system operation. In such instances, the entire energy storage flywheel system could become inoperable. Thus, it is desirable to provide sufficient redundancy within an energy storage flywheel system, most notably for space applications, to reduce the likelihood of system inoperability. Unfortunately, most redundancy schemes, such as dual motor/generators, and/or dual primary bearings, etc., can undesirably increase overall system weight.

Hence, there is a need for a redundant energy storage flywheel system for spacecraft applications that is fully redundant, yet does not significantly increase overall system and spacecraft weight. The present invention addresses at least this need.

BRIEF SUMMARY

The present invention provides a fully redundant energy storage flywheel system for spacecraft power and attitude control.

In one embodiment, and by way of example only, an energy storage flywheel system includes a shaft, a flywheel assembly, a plurality of magnetic bearing assemblies, a plurality of secondary bearing assemblies, a secondary bearing actuator assembly, and a motor/generator. The flywheel assembly is mounted on the shaft. Each magnetic bearing assembly includes a primary actuator coil and a secondary actuator coil. Each actuator coil is adapted to be selectively energized and deenergized, and is configured, when energized, to rotationally mount the flywheel assembly in a non-contact manner. Each secondary bearing assembly is configured to selectively rotationally support the shaft. The secondary bearing actuator assembly is coupled to one or more of the secondary bearing assemblies, and includes a primary drive coil and a secondary drive coil. Each secondary bearing actuator assembly drive coil is adapted to selectively receive actuator control signals and is operable, in response thereto, to cause the secondary bearing actuator assembly to move the one or more secondary bearing assemblies to one of an engage position, in which each secondary bearing assembly rotationally supports the shaft, and a disengage position, in which each secondary bearing assembly does not rotationally supports the shaft. The motor/generator is coupled to the energy storage flywheel and is configured to operate in either a motor mode or a generate mode. The motor/generator includes a rotor and a stator, and the stator includes a primary stator coil and a secondary stator coil.

In another exemplary embodiment, an energy storage flywheel system includes a gimbal frame, a flywheel housing, a shaft, a flywheel assembly, a plurality of magnetic bearing assemblies, a plurality of secondary bearing assemblies, a secondary bearing actuator assembly, a motor/generator, and a gimbal actuator. The flywheel housing assembly is rotationally mounted on the gimbal frame, and the shaft is rotationally mounted on the housing assembly. The flywheel assembly is mounted on the shaft. Each magnetic bearing assembly includes a primary actuator coil and a secondary actuator coil. Each actuator coil is adapted to be selectively energized and deenergized, and is configured, when energized, to rotationally mount the flywheel assembly in a non-contact manner. Each secondary bearing assembly is configured to selectively rotationally support the shaft. The secondary bearing actuator assembly is coupled to one or more of the secondary bearing assemblies, and includes a primary drive coil and a secondary drive coil. Each secondary bearing actuator assembly drive coil is adapted to selectively receive actuator control signals and is operable, in response thereto, to cause the secondary bearing actuator assembly to move the one or more secondary bearing assemblies to one of an engage position, in which each secondary bearing assembly rotationally supports the shaft, and a disengage position, in which each secondary bearing assembly does not rotationally supports the shaft. The motor/generator is coupled to the energy storage flywheel and is configured to operate in either a motor mode or a generate mode. The motor/generator includes a rotor and a stator, and the stator includes a primary stator coil and a secondary stator coil. The gimbal actuator is coupled between the gimbal frame and the flywheel housing assembly, and includes at least a primary drive coil and a secondary drive coil. Each gimbal actuator drive coil is adapted to selectively receive gimbal control signals and is operable, in response thereto, to cause the gimbal actuator to move the flywheel housing assembly relative to the gimbal frame.

Other independent features and advantages of the preferred energy storage flywheel system will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in a satellite, it will be appreciated that it can be implemented in other systems and environments, both terrestrial and extraterrestrial.

Figure 1:
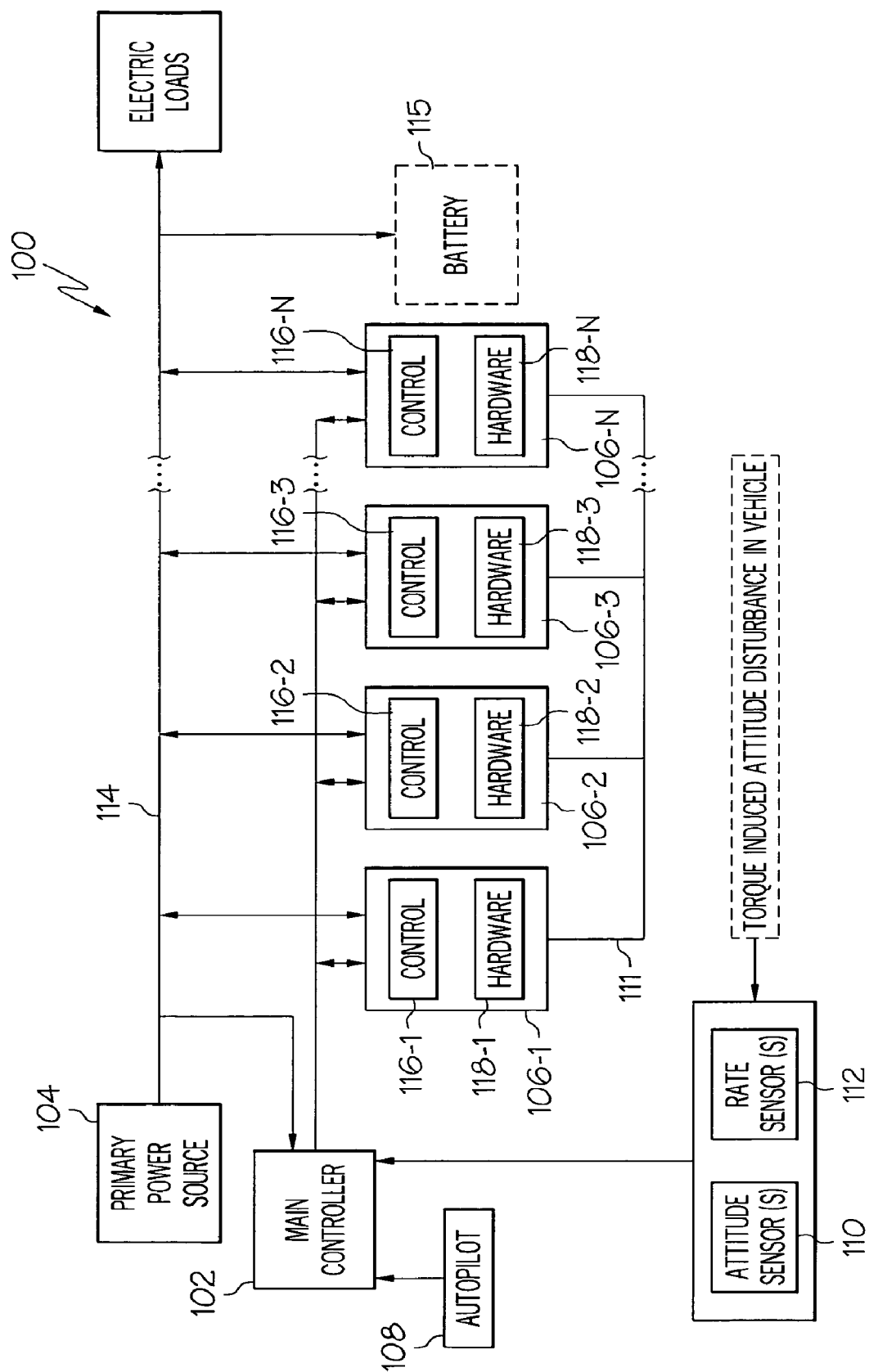
FIG. 1 is a simplified schematic representation of an exemplary energy storage flywheel system that includes an exemplary embodiment of a retention system in a disengaged configuration.
Figure 2:
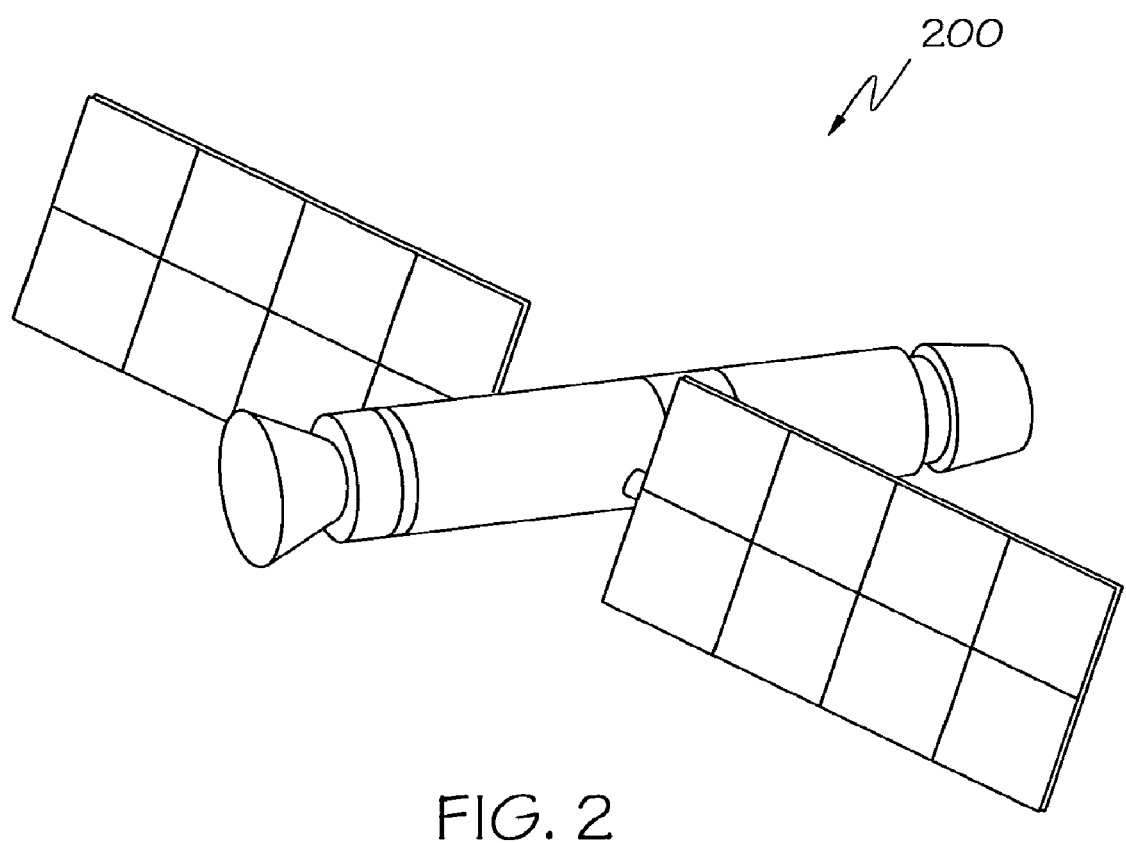
FIG. 2 is a simplified schematic representation of the system shown in FIG. 1, but with the exemplary retention system in an engaged configuration.

Turning now to the description and with reference first to FIG. 1, a functional block diagram of an exemplary integrated power and attitude control system 100 for a spacecraft is shown. The system 100 includes a main controller 102, a primary power source 104, and a plurality of flywheel systems 106 (106-1, 106-2, 106-3, . . . 106-N). A perspective view of an exemplary physical embodiment of a spacecraft 200 that may use the system 100 is illustrated in FIG. 2.

The main controller 102 receives attitude commands (or torque commands) from, for example, an earthbound station or its onboard autopilot 108, and monitors the electrical distribution system 114, and appropriately controls the operation of the flywheel systems 106. In response to the torque commands, the flywheel systems 106 are controlled to induce appropriate attitude disturbances in the spacecraft, and thereby control spacecraft attitude. In addition, depending upon the state of the electrical distribution system 114, the flywheel systems 106 are controlled to either supply electrical energy to, or draw electrical energy from, the electrical distribution system. One or more spacecraft dynamic sensors, such as one or more attitude sensors 110 and one or more rate sensors 112, sense spacecraft attitude and attitude rate-of-change, respectively, and supply feedback signals representative thereof to the main controller 102. A detailed description of the main controller 102 and the process it implements to control power and attitude is not needed to enable or describe the claimed invention and, therefore, will not be provided.

The primary power source 104, as its name connotes, is the primary source of electrical power to the electrical distribution system 114. In the depicted embodiment, in which the system 100 is implemented in a spacecraft, the primary power source 104 is one or more solar panels, each of which includes an array of solar cells to convert light energy into electrical energy. The solar panels 104 may be attached to the spacecraft itself or to fixed or moveable structures that extend from the spacecraft. When the spacecraft 200 is positioned such that it does not receive sunlight, such as, for example, when it is in the Earth's shadow, a backup electrical power source is needed. As was alluded to above, in addition to providing attitude control, the flywheel systems 106 also function as a backup power source. The flywheel systems 106 may also provide electrical power if the power demanded by the electrical loads exceeds the capacity of the primary power source 104. It will be appreciated that another backup power source, such as a battery 115 (shown in phantom in FIG. 1), may also be provided.

The system 100 includes N number of energy storage flywheel systems 106 (106-1, 106-2, 106-3, . . . 1-6-N). The system 100 is preferably configured so that some of the flywheel systems 106 are active, while one or more of the remaining flywheel systems 106 is in a standby, inactivated state. Thus, the system 100 is at least single fault tolerant. The number of flywheel systems 106 that are active may vary, depending on system requirements. In a particular preferred embodiment, four flywheel systems 106 are active and the remaining are inactive.

Figure 3:
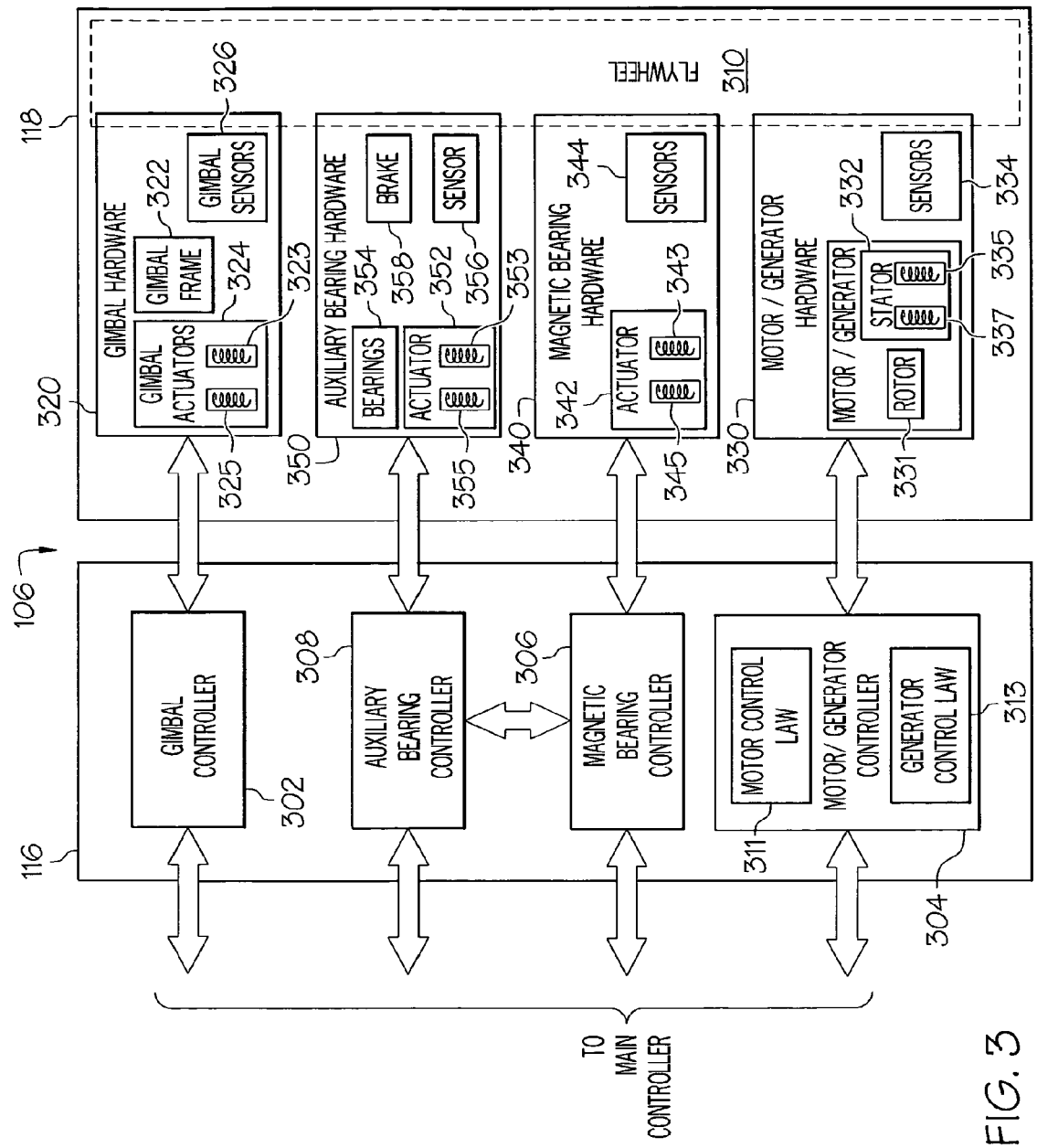
FIG. 3 is a functional block diagram of an exemplary embodiment of one energy storage flywheel system that may be used in the system of FIG. 1.

The flywheel systems 106 each include a flywheel control module 116 (116-1, 116-2, 116-3, . . . 116-N) and flywheel hardware 118 (118-1, 118-2, 118-3, . . . 118-N). The flywheel control modules 116 are each in operable communication with the main controller 102 and, in the depicted embodiment, are in communication with one another via a data bus 111. The main controller 102, as was noted above, supplies attitude control commands to the each of the flywheel control modules 116. In turn, the flywheel control modules 116 control the relative attitudes and angular velocities of the associated flywheel hardware 118 to effect attitude control of the spacecraft 200. The flywheel control modules 116 also respond to commands from the main controller 102 to control the operation of the associated flywheel hardware 118 in either a motor mode or a generator mode, and the rotational acceleration of the associated flywheel hardware 118 in each mode. The flywheel control modules 116, as is discussed in more detail below, also monitor various parameters of the associated flywheel hardware 118, and supply representative signals to the main controller 102. A block diagram of an exemplary embodiment of one flywheel system 106 is illustrated in FIG. 3, and will now be discussed in detail.

In the depicted embodiment, the flywheel control modules 116 each include four separate controllers, a gimbal controller 302, a motor/generator controller 304, a magnetic bearing controller 306, and an auxiliary bearing controller 308. The flywheel hardware 118 each include an energy storage flywheel assembly 310, gimbal hardware 320, motor/generator hardware 330, magnetic bearing hardware 340, and auxiliary bearing hardware 350. Particular preferred embodiments of each of these portions of the flywheel control modules 116 and the flywheel hardware 118 will be now be described in more detail.

The gimbal controller 302 receives gimbal angle velocity commands from the main controller 102, and supplies appropriate gimbal control signals to, and receives various feedback signals from, the gimbal hardware 320, to effect attitude control. At least some of the feedback signals the gimbal controller 320 receives are representative of the gimbal hardware 320 response to the supplied control signals. The gimbal controller 302 also supplies these feedback signals to the main controller 102.

In the depicted embodiment, the gimbal hardware 320 one or more gimbal frames 322, one or more gimbal actuators 324, and one or more gimbal sensors 326. The flywheel assembly 310 is rotationally mounted in the gimbal frame 322 about a gimbal axis. The gimbal axis is perpendicular to the spin axis of the energy storage flywheel assembly 310. The gimbal actuator 324 is coupled to the gimbal frame 322, and is also coupled to receive the control signals from the gimbal controller 302. The gimbal actuator 324 is preferably implemented as an electromechanical actuator, and includes at least a primary drive coil 323 and a secondary drive coil 325. The primary and secondary drive coils 323, 325 are each coupled to selectively receive the gimbal control signals supplied from the gimbal controller 302 and are operable, in response to the gimbal control signals, to cause the gimbal actuator 324 to move the flywheel assembly 310 relative to the gimbal frame 322.

The drive coil 323, 325 to which the gimbal controller 302 supplies the gimbal control signals is based, at least in part, on the feedback signals supplied to the gimbal controller 302. More specifically, the gimbal controller 302 is configured to normally supply the gimbal control signals to, for example, the primary drive coil 323. However, if the gimbal controller 302 determines, based at least in part on the received feedback signals, that the primary drive coil 323 is inoperable, the gimbal controller 302 will automatically supply the gimbal control signals to the secondary drive coil 325.

Figure 6:
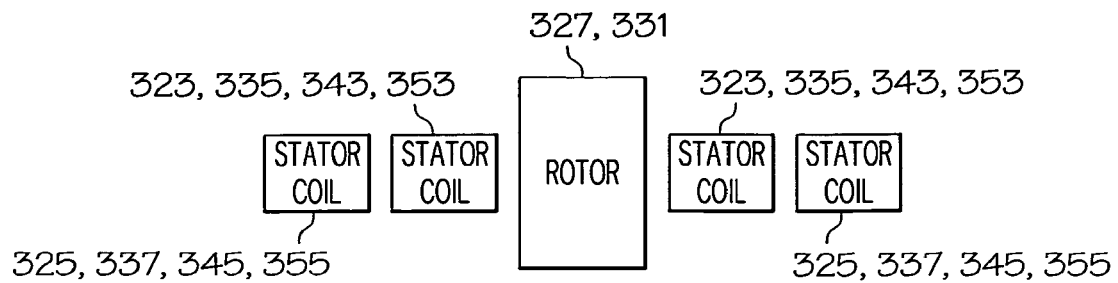
FIGS. 6-8 depict various configurations for implementing redundancy in the energy storage flywheel system of FIG. 3.
Figure 7:
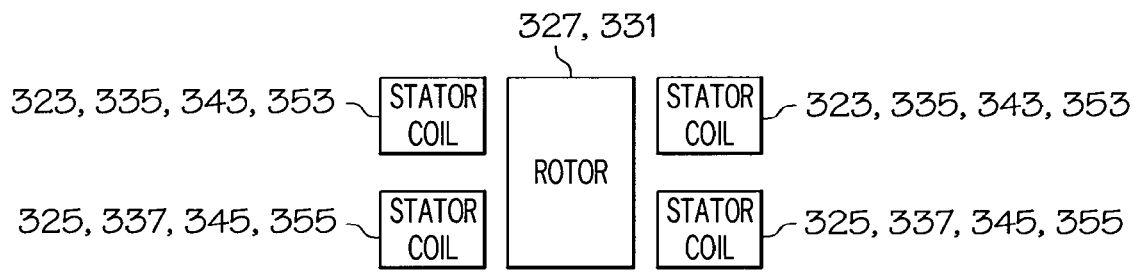
Figure 8:
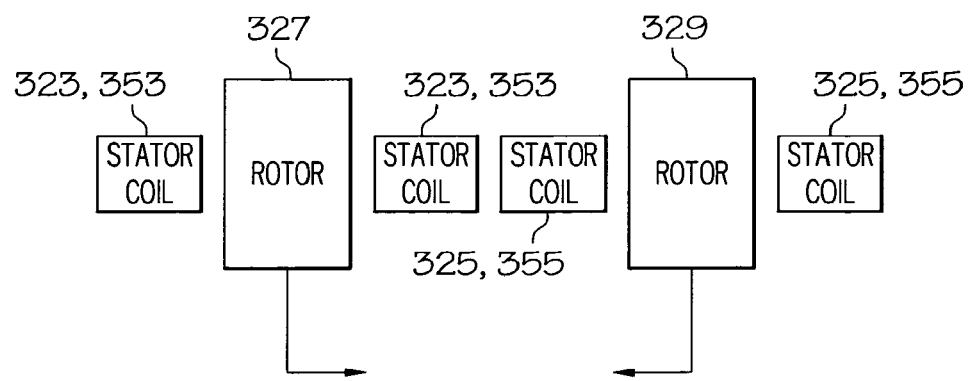

It will be appreciated that the gimbal actuator 324 may be implemented in accordance with any one of numerous configurations. For example, the gimbal actuator 324 may be implemented such that the primary and second drive coils 323, 325 are both associated with a single rotor 327. In such instances, as is depicted in FIGS. 6 and 7, the drive coils 323, 325 could be either radially or axially displaced from each other. Alternatively, as depicted in FIG. 8, the gimbal actuator 324 could be implemented such that each drive coil 323, 325 is associated with its own individual rotor 327, 329.

As is generally known, attitude control in a spacecraft may be implemented by changing the gimbal angles at certain rates (e.g., angular velocities). Thus, in response to the commands received from the main controller 102, the gimbal controller 302 supplies appropriate gimbal control signals to either the gimbal actuator primary 323 or secondary 325 coils. In response to these control signals, the gimbal actuators 324 appropriately position the flywheel assembly 310 with respect to the gimbal frame 322 at the appropriate angular velocities. The gimbal sensors 326 include sensors that can sense at least the position and rate of the flywheel with respect to the gimbal frame 322, and supply position and rate feedback signals to the gimbal controller 302 and to the main controller 102.

The motor/generator controller 304 receives a signal representative of the bus voltage of the electrical distribution system 114 and, in response, configures the motor/generator hardware 330 to operate as either a motor or a generator. The motor/generator controller 304 also receives commands from the main controller 102 and, in response, controls the rotational acceleration of the motor/generator and thus the flywheel assembly 310. To do so, the motor/generator controller 304 is configured to selectively implement either a motor control law 311 or a generator control law 313. The motor/generator controller 304 also receives various feedback signals from the motor/generator hardware 330. At least some of the feedback signals received by the motor/generator controller 304 are representative of the motor/generator hardware 330 response to the supplied control signals. The motor/generator controller 304 supplies one or more of the feedback signals it receives from the motor/generator hardware 330 to the main controller 102.

The motor/generator hardware 330 includes a motor/generator 332 and one or more sensors 334. The motor/generator 332 may be any one of numerous motor/generator sets known now, or in the future, and includes at least a main rotor 331 and a stator 333. The rotor 331 is preferably implemented as a permanent magnet rotor, and is coupled to the rotor of the flywheel assembly 310. The stator 333 includes at least a primary stator coil 335 and a secondary stator coil 337. The motor/generator primary and secondary stator coils 335, 337, similar to the gimbal actuator 324, and as depicted in FIGS. 6 and 7, could be either radially or axially displaced from each other.

The sensors 334 include one or more temperature sensors and one or more commutation sensors. When the bus voltage of the electrical distribution system 114 is sufficiently high, the motor/generator controller 304 implements the motor control law 311 and the motor/generator 332 is operated as a motor. During operation as a motor, the motor/generator 332 spins up the flywheel assembly 310, to store rotational kinetic energy. Conversely, when the bus voltage of the electrical distribution system 114 drops to some predetermined magnitude, the motor/generator controller 304 implements the generator control law 313 and the motor/generator 332 is operated as a generator. During its operation as a generator, the motor/generator 332 spins down the flywheel assembly 310, converting the flywheel's stored rotational kinetic energy to electrical energy. As was previously discussed, changes in the rotational speed of the flywheel assembly 310 can impact the attitude of the spacecraft. Thus, in both the motor mode and generator mode, the flywheel assembly 310 is spun up, or spun down, to a rotational velocity at an acceleration commanded by the main controller 102.

No matter which mode the motor/generator 332 is operating in, either the primary stator coil 335 or the secondary stator coil 337 are supplying power to, or receiving power from, the electrical distribution system 114. Preferably, the motor/generator controller 304 controls the particular stator coil 335, 337 that is supplying power to, or receiving power from, the electrical distribution system 114. In particular, the motor/generator controller 304 is configured such that the primary stator coil 335 normally supplies power to, or receives power from, the electrical distribution system 114. However, if the motor/generator controller 304 determines, based at least in part on the received feedback signals, that the primary stator coil 335 is inoperable, the motor/generator controller 304 will automatically configure the motor/generator 332 such that secondary stator coil 337 supplies power to, or receives power from, the electrical distribution system 114.

The magnetic bearing controller 306 may also receive one or more commands from the main controller 102. The magnetic bearing controller 306, in accordance with a control law, supplies appropriate command signals to, and receives various feedback signals from, the magnetic bearing hardware 340. At least some of the feedback signals received by the magnetic bearing controller 306 are representative of the magnetic bearing hardware 340 response to the supplied control signals. In some embodiments, the magnetic bearing controller 306 may also supply one or more of the feedback signals it receives to the auxiliary bearing controller 308. Moreover, similar to the gimbal controller 302, the magnetic bearing controller 306 may additionally supply one or more of the feedback signals it receives to the main controller 102.

The magnetic bearing hardware 340 functions to rotationally support or levitate, in non-contact fashion, the energy storage flywheel assembly 310, and is the primary bearing system for the energy storage flywheel assembly 310. In the depicted embodiment, the magnetic bearing hardware 340 implements active magnetic bearings, and includes electromagnetic actuators 342 and one or more sensors 344 such as, for example, position sensors, temperature sensors, and speed sensors. The position sensors 344 sense the position of the flywheel rotor (not illustrated) and supply appropriate position signals to the magnetic bearing controller 306. The magnetic bearing controller 306, in accordance with the control law, supplies the appropriate current magnitude to the electromagnetic actuators 342, which in turn generate magnetic forces of the appropriate magnitude to appropriately position the flywheel rotor. Although active magnetic bearings are described as being implemented in the system shown in FIG. 3, it will be appreciated that the magnetic bearing hardware 340 could be configured to implement passive magnetic bearings. Alternatively, other types of bearing assemblies could be used to implement the primary bearing assemblies such as, for example, non-magnetic rolling element bearings.

The magnetic bearing actuator 342, similar to the gimbal actuator 324 and motor/generator 332, is redundantly configured. In particular, the magnetic bearing actuator 342 includes both a primary actuator coil 343 and a secondary actuator coil 345. The primary and secondary actuator coils 343, 345 are each coupled to be selectively energized via the magnetic bearing controller 306. The actuator coil 343, 345 which the magnetic bearing controller 306 selectively energizes is based, at least in part, on the feedback signals supplied to the magnetic bearing controller 306. More specifically, the magnetic bearing controller 306 is configured to normally selectively energize, for example, the primary actuator coil 343. However, if the magnetic bearing controller 306 determines, based at least in part on the received feedback signals, that the primary actuator coil 343 is inoperable, the magnetic bearing controller 306 will automatically selectively energize the secondary actuator coil 345. As FIGS. 6 and 7 further depict, it will be appreciated that the magnetic bearing actuator primary and secondary coils 343, 345, similar to the gimbal actuator 324 and motor/generator 332, could be either radially or axially displaced from each other.

The auxiliary bearing controller 308 receives various signals representative of magnetic bearing hardware operability and various feedback signals from the auxiliary bearing hardware 350. In response to these signals, the auxiliary bearing controller 308 supplies appropriate command signals to the auxiliary bearing hardware 350. In particular, the auxiliary bearing controller 308 receives a feedback signal representative of the position of the auxiliary bearing hardware, and may additionally receive a signal representative of the bus voltage of the electrical distribution system 114. In response to these signals, the auxiliary bearing controller supplies appropriate command signals to the auxiliary bearing hardware 350.

The auxiliary bearing hardware 350 is used to rotationally support the energy storage flywheel assembly 310 when the magnetic bearing hardware 340 is inoperable, or is otherwise not capable of properly doing so. The auxiliary bearing hardware 350 includes an actuator assembly 352, one or more auxiliary (or secondary) bearing assemblies 354, one or more position sensors 356, and a brake assembly 358. The actuator assembly 352, in response to appropriate command signals from the auxiliary bearing controller 308, moves the auxiliary bearing assemblies 354 to either an engage position or a disengage position. In the disengage position, which is the normal position of the auxiliary bearing assemblies 354, the auxiliary bearing assemblies 354 are disengaged from, and do not rotationally support, the flywheel assembly 310. Rather, the flywheel assembly 310 is rotationally supported by the magnetic bearing hardware 340. Conversely, in the engage position the auxiliary bearing assemblies 354 engage, and rotationally support, the flywheel assembly 310.

The auxiliary bearing actuator assembly 352, similar to the gimbal actuators 324, the motor/generators 332, and the magnetic bearing actuators 342, are configured with suitable redundancy. In particular, the auxiliary bearing actuator assembly 352 is preferably implemented as an electromechanical actuator, and includes at least a primary drive coil 353 and a secondary drive coil 355. The primary and secondary drive coils 353, 355 are each coupled to selectively receive the command signals supplied from the auxiliary bearing controller 308. The drive coil 353, 355 to which the auxiliary bearing actuator assembly 352 supplies the command signals is based, at least in part, on the feedback signals supplied to the auxiliary bearing actuator assembly 352. More specifically, the auxiliary bearing actuator assembly 352 is configured to normally supply the command signals to, for example, the primary drive coil 353. However, if the auxiliary bearing actuator assembly 352 determines, based at least in part on the received feedback signals, that the primary drive coil 353 is inoperable, the auxiliary bearing actuator assembly 352 will automatically supply the command signals to the secondary drive coil 355.

It will be appreciated that the auxiliary bearing actuator assembly 352 may be implemented in accordance with any one of numerous configurations. For example, the auxiliary bearing actuator assembly 352 may be implemented similar to the gimbal actuator 324, such that the primary and second drive coils 353, 355 are both associated with a single rotor 357. Moreover, as is depicted in FIGS. 6 and 7, the drive coils 353, 355 could be either radially or axially displaced from each other or, as depicted in FIG. 8, each drive coil 353, 355 could alternatively be associated with its own individual rotor 327, 329.

Figure 4:
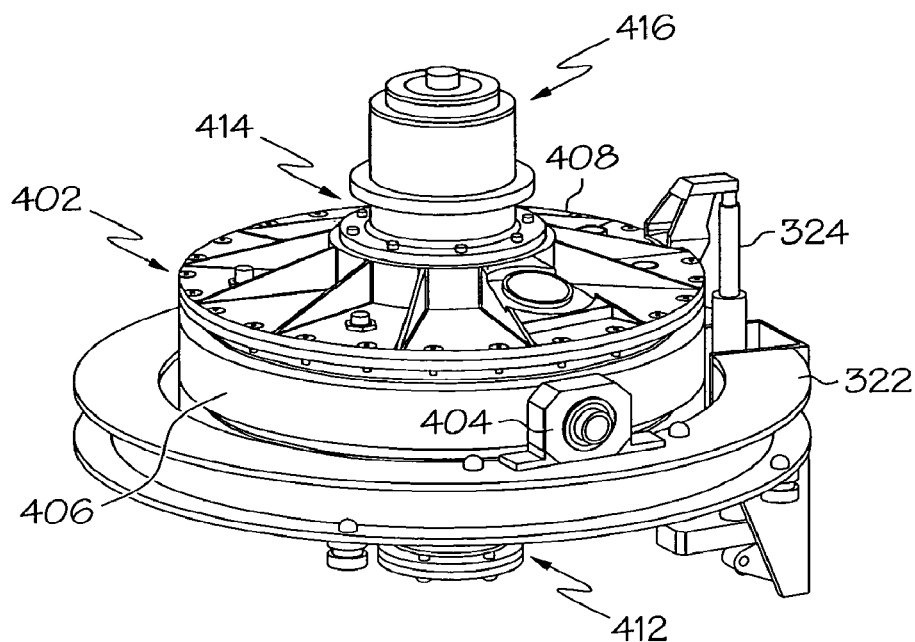
FIGS. 4 and 5 are perspective and cross section views, respectively, of a physical embodiment of the energy storage flywheel system of FIG. 3.
Figure 5:
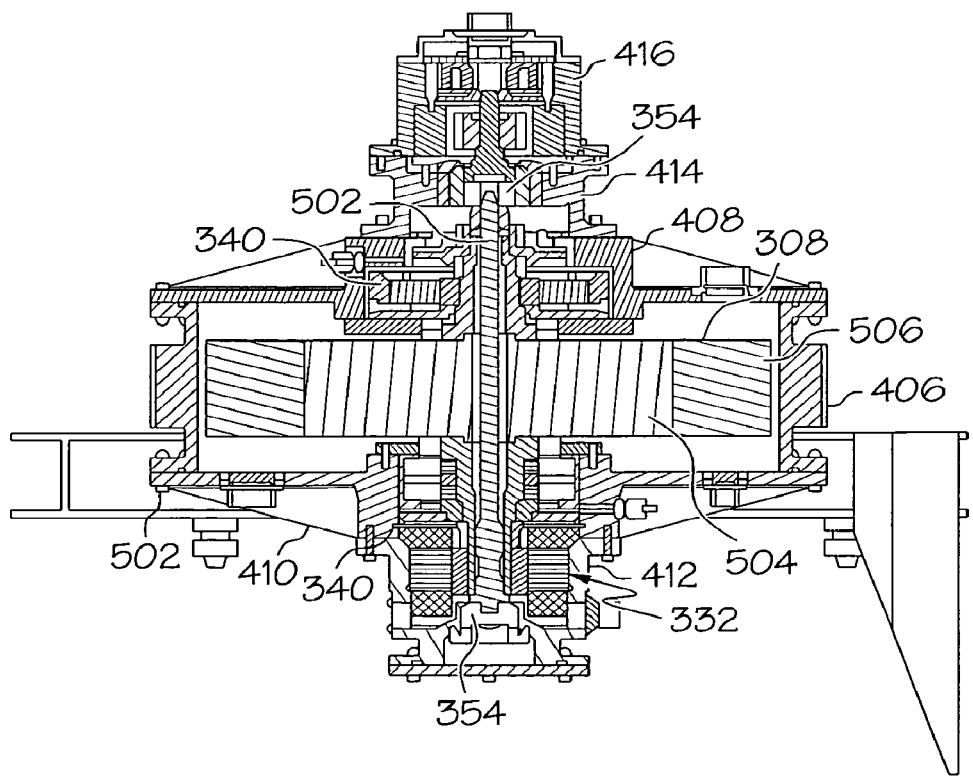

For completeness, reference should now be made to FIGS. 4 and 5, which depict an exemplary physical embodiment of an energy storage flywheel system 106. As depicted in these figures, the exemplary flywheel system 106 preferably includes a housing assembly 402, which is rotationally mounted in the gimbal frame 322 via two gimbal bearings 404 (only one shown). A single gimbal actuator 324 is mounted on the gimbal frame 322 and, as was noted above, receives control signals from the gimbal controller 302 (not shown in FIGS. 4 and 5) to position the housing assembly 402 at the appropriate angular velocities, to thereby effect attitude control.

The housing assembly 402 includes a central section 406, two end sections 408 and 410, a motor/generator housing 412, an auxiliary bearing housing 414, and an auxiliary motor housing 416. Although the housing assembly 402 is depicted as being constructed of numerous sections that are coupled together, it will be appreciated that it could be formed as an integral structure. In any event, the motor/generator housing 412 is coupled to the housing assembly second end section 410, the auxiliary bearing housing 414 is coupled to the housing assembly first end section 408, and the auxiliary motor housing 416 is coupled to the auxiliary bearing housing 414.

The motor/generator 332 stator is mounted in the motor/generator housing 412 and the motor/generator 332 rotor is coupled to the flywheel assembly 310. The flywheel assembly 310, as shown more particularly in FIG. 5, includes a shaft assembly 502, a hub 504, and a flywheel rim 506. The shaft assembly 502 is rotationally mounted in the housing assembly 402 via either two sets of the magnetic bearing hardware 340 or two auxiliary bearing assemblies 354. The hub 504 is preferably constructed of a high-strength metal alloy, and is mounted on the shaft assembly 502. The hub 504 may be constructed in any one of numerous configurations including, for example, a solid configuration, a spoke-type configuration, or a combination thereof. The flywheel rim 506 is mounted on, and surrounds, the hub 504, and is preferably constructed of a material having a high strength-to-density ratio such as, for example, filament wound carbon fiber.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An energy storage flywheel system, comprising:
a shaft;
a flywheel assembly mounted on the shaft;
a plurality of magnetic bearing assemblies, each magnetic bearing assembly including a primary actuator coil and a secondary actuator coil, each actuator coil adapted to be selectively energized and deenergized, and configured, when energized, to rotationally mount the flywheel assembly in a non-contact manner;
a plurality of secondary bearing assemblies, each secondary bearing assembly configured to selectively rotationally support the shaft;
a secondary bearing actuator assembly coupled to one or more of the secondary bearing assemblies, the secondary bearing actuator assembly including a primary drive coil and a secondary drive coil, each secondary bearing actuator assembly drive coil adapted to selectively receive actuator control signals and operable, in response thereto, to cause the secondary bearing actuator assembly to move the one or more secondary bearing assemblies to one of (i) an engage position, in which each secondary bearing assembly rotationally supports the shaft, and (ii) a disengage position, in which each secondary bearing assembly does not rotationally supports the shaft; and
a motor/generator coupled the energy storage flywheel and configured to operate in either a motor mode or a generate mode, the motor/generator including a rotor and a stator, the stator including a primary stator coil and a secondary stator coil.

2. The system of claim 1, further comprising:
a magnetic bearing control circuit adapted to receive one or more magnetic bearing monitor signals representative of magnetic bearing assembly operability and configured, in response to the magnetic bearing monitor signals, to selectively supply magnetic bearing activation control signals to either the primary actuator or the secondary actuator of each magnetic bearing assembly.

3. The system of claim 1, further comprising:
a secondary bearing control circuit adapted to receive one or more signals representative of secondary bearing actuator assembly operability and operable, in response thereto, to selectively supply the actuator control signals to the primary drive coil or the secondary drive coil.

4. The system of claim 1, further comprising:
a motor/generator control circuit adapted to receive one or more signals representative of motor/generator operability and operable, in response thereto, to configure the motor/generator to supply or draw power via either the primary stator coil set or the secondary stator coil set.

5. The system of claim 1, wherein:
each secondary bearing actuator assembly includes a primary rotor and a secondary rotor;
the secondary bearing actuator primary drive coil, upon receiving actuator control signals, causes the secondary bearing actuator assembly primary rotor to rotate; and
the secondary bearing actuator secondary drive coil, upon receiving actuator control signals, causes the secondary bearing actuator assembly secondary rotor to rotate.

6. The system of claim 1, further comprising:
a gimbal frame;
a flywheel housing assembly upon which the shaft is rotationally mounted, the flywheel housing assembly rotationally mounted on the gimbal frame; and
a gimbal actuator coupled between the gimbal frame and flywheel housing assembly, the gimbal actuator including at least a primary drive coil and a secondary drive coil, each gimbal actuator drive coil adapted to selectively receive gimbal control signals and operable, in response thereto, to cause the gimbal actuator to move the flywheel housing assembly relative to the gimbal frame.

7. The system of claim 6, further comprising:
a gimbal control circuit adapted to receive one or more signals representative of gimbal actuator operability and operable, in response thereto, to selectively supply the gimbal control signals to the primary drive coil or the secondary drive coil.

8. The system of claim 6, wherein:
the gimbal actuator includes a primary rotor and a secondary rotor;
the gimbal actuator primary drive coil, upon receiving gimbal control signals, causes the gimbal actuator primary rotor to rotate; and
the gimbal actuator secondary drive coil, upon receiving gimbal control signals, causes the gimbal actuator secondary rotor to rotate.

9. The system of claim 1, further comprising:
a brake assembly coupled to the secondary bearing actuator, the brake assembly including a primary brake coil and a secondary brake coil, each brake coil adapted to receive brake control signals and operable, in response thereto, to selectively inhibit movement of one or more of the secondary bearing actuator assemblies.

10. The system of claim 8, further comprising:
a control circuit adapted to receive one or more signals representative of brake assembly operability and operable, in response thereto, to selectively supply the brake control signals to the primary brake coil or the secondary brake coil.

11. The system of claim 1, wherein each of the secondary bearing assemblies comprises a mechanical bearing assembly.

12. An energy storage flywheel system, comprising:
a gimbal frame;
a flywheel housing assembly g rotationally mounted on the gimbal frame;
a shaft rotationally mounted on the housing assembly;

a flywheel assembly mounted on the shaft;

a plurality of magnetic bearing assemblies, each magnetic bearing assembly including a primary actuator coil and a secondary actuator coil, each actuator coil adapted to be selectively energized and deenergized, and configured, when energized, to rotationally mount the flywheel assembly in a non-contact manner;

a plurality of secondary bearing assemblies, each secondary bearing assembly configured to selectively rotationally support the shaft;

a secondary bearing actuator assembly coupled to one or more of the secondary bearing assemblies, the secondary bearing actuator assembly including a primary drive coil and a secondary drive coil, each secondary bearing actuator assembly drive coil adapted to selectively receive actuator control signals and operable, in response thereto, to cause the secondary bearing actuator assembly to move the one or more secondary bearing assemblies to one of (i) an engage position, in which each secondary bearing assembly rotationally supports the shaft, and (ii) a disengage position, in which each secondary bearing assembly does not rotationally supports the shaft;

a motor/generator coupled the energy storage flywheel and configured to operate in either a motor mode or a generate mode, the motor/generator including a rotor and a stator, the stator including a primary stator coil and a secondary stator coil; and a gimbal actuator coupled between the gimbal frame and flywheel housing assembly, the gimbal actuator including at least a primary drive coil and a secondary drive coil, each gimbal actuator drive coil adapted to selectively receive gimbal control signals and operable, in response thereto, to cause the gimbal actuator to move the flywheel housing assembly relative to the gimbal frame.

13. The system of claim 12, further comprising:
a magnetic bearing control circuit adapted to receive one or more magnetic bearing monitor signals representative of magnetic bearing assembly operability and configured, in response to the magnetic bearing monitor signals, to selectively supply magnetic bearing activation control signals to either the primary actuator or the secondary actuator of each magnetic bearing assembly.

14. The system of claim 12, further comprising:
a secondary bearing control circuit adapted to receive one or more signals representative of secondary bearing actuator assembly operability and operable, in response thereto, to selectively supply the actuator control signals to the primary drive coil or the secondary drive coil.

15. The system of claim 12, further comprising:
a motor/generator control circuit adapted to receive one or more signals representative of motor/generator operability and operable, in response thereto, to configure the motor/generator to supply or draw power via either the primary stator coil set or the secondary stator coil set.

16. The system of claim 12, wherein:
each secondary bearing actuator assembly includes a primary rotor and a secondary rotor;
the secondary bearing actuator primary drive coil, upon receiving actuator control signals, causes the secondary bearing actuator assembly primary rotor to rotate; and
the secondary bearing actuator secondary drive coil, upon receiving actuator control signals, causes the secondary bearing actuator assembly secondary rotor to rotate.

17. The system of claim 12, further comprising:
a gimbal control circuit adapted to receive one or more signals representative of gimbal actuator operability and operable, in response thereto, to selectively supply the gimbal control signals to the primary drive coil or the secondary drive coil.

18. The system of claim 12, wherein:
the gimbal actuator includes a primary rotor and a secondary rotor;
the gimbal actuator primary drive coil, upon receiving gimbal control signals, causes the gimbal actuator primary rotor to rotate; and
the gimbal actuator secondary drive coil, upon receiving gimbal control signals, causes the gimbal actuator secondary rotor to rotate.

19. The system of claim 12, further comprising:
a brake assembly coupled to the secondary bearing actuator, the brake assembly including a primary brake coil and a secondary brake coil, each brake coil adapted to receive brake control signals and operable, in response thereto, to selectively inhibit movement of one or more of the secondary bearing actuator assemblies.

20. The system of claim 19, further comprising:
a control circuit adapted to receive one or more signals representative of brake assembly operability and operable, in response thereto, to selectively supply the brake control signals to the primary brake coil or the secondary brake coil.

* * * * *

UNITED STATES PATENT AND TRADEMARK OFFICE
CERTIFICATE OF CORRECTION

| | | |
|---|---|---|
| PATENT NO. | : 7,608,951 B2 | Page 1 of 1 |
| APPLICATION NO. | : 11/580664 | |
| DATED | : October 27, 2009 | |
| INVENTOR(S) | : Potter et al. | |

It is certified that error appears in the above-identified patent and that said Letters Patent is hereby corrected as shown below:

Column 10, line 65, "a flywheel housing assembly g rotationally mounted on the" should be changed to --a flywheel housing assembly rotationally mounted on the--.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,608,951 B2 Page 1 of 1
APPLICATION NO. : 11/580664
DATED : October 27, 2009
INVENTOR(S) : Potter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 477 days.

Signed and Sealed this

Twelfth Day of October, 2010

David J. Kappos
*Director of the United States Patent and Trademark Office*